United States Patent

Gabbard

[11] Patent Number: 5,484,566
[45] Date of Patent: Jan. 16, 1996

[54] METHOD OF MANUFACTURE OF A PARTIALLY LAMINATED RUBBER CLOSURE

[75] Inventor: Mark E. Gabbard, Salisbury, Md.

[73] Assignee: Wheaton Inc., Millville, N.J.

[21] Appl. No.: 207,133

[22] Filed: Mar. 7, 1994

[51] Int. Cl.$^6$ .............................. B29C 43/18; B29C 45/14
[52] U.S. Cl. ............................................ 264/250; 264/266
[58] Field of Search ..................................... 264/250, 266; 215/247, 364; 220/306, 307, 352

[56] References Cited

U.S. PATENT DOCUMENTS

| 3,755,031 | 8/1973 | Hoffman et al. | 156/79 |
| 3,760,969 | 9/1973 | Shimamoto et al. | 215/37 R |
| 4,075,266 | 2/1978 | Theysohn | 264/92 |
| 4,441,621 | 4/1984 | Matukura et al. | 215/247 |
| 5,288,560 | 2/1994 | Sudo et al. | 428/494 |

FOREIGN PATENT DOCUMENTS 204486A  10/1986  European Pat. Off. .

4022362  1/1992  Japan ....................................... 215/364

Primary Examiner—Jan H. Silbaugh
Assistant Examiner—Robin S. Gray
Attorney, Agent, or Firm—Ratner & Prestia

[57] ABSTRACT

A partially PTFE laminated rubber closure for pharmaceutical vials which resists undesired removal prior to placement of an aluminium over-cap on the vial and closure. The rubber closure includes a flat circular head which protrudes over the end of the pharmaceutical vial. Secured to the underside of the head is a cylindrical sealing portion which is partially laminated with PTFE at its lower end. Above the end of the PTFE on the outside of the sealing portion is a protruding ring of rubber. This ring allows good high friction contact between the closure and the vial which prevents the closure from dislodging during transportation of the vial after application of the closure and prior to application of an aluminum overcap. A method for making the closure is also provided.

7 Claims, 6 Drawing Sheets

METHOD OF MANUFACTURE OF A PARTIALLY LAMINATED RUBBER CLOSURE

BACKGROUND OF THE INVENTION

1. Field of the Invention

The present invention relates to barrier-coated rubber closures for use as medical vial closures in the pharmaceutical industry, and to a method of making such closures.

2. Description of the Prior Art

Unprotected rubber closures for vials containing pharmaceutical agents give rise to a multitude of problems and complications. First, the rubber closures can deteriorate and allow bits of rubber to contaminate the pharmaceutical composition. This can be hastened by the particular type of pharmaceutical composition contained within the vial, since some such compositions can react with the rubber to further deteriorate the rubber closure.

Furthermore, the rubber will often contain stabilizers, conditioners, or other additives which can leach out of the rubber and into the pharmaceutical composition resulting in a contaminated pharmaceutical composition which may be ineffective or harmful to a patient.

In an attempt to circumvent such problems, rubber closures have been developed, in which the leg portion which protrudes into the pharmaceutical vial is fully coated with a barrier layer, such as a polytetrafluoroethylene compound, in order to insulate the rubber closure from direct contact with the pharmaceutical product contained in the vial. In this way, contamination of the pharmaceutical by the rubber stopper is prevented. One major draw-back of such fully coated structures is their inability to seal the pharmaceutical vial from outside gases including air. Fluorinated resins, such as polytetrafluoroethylene (PTFE) make excellent barrier layers, but their ability to seal is extremely poor. Accordingly, fully coated PTFE rubber closures are inadequate where the exclusion of air from the vial is necessary or desired. (This characteristic is also generally true of variants and modifications of polymers, some of which may include additives and/or copolymers.) These variants and modifications may provide, as compared to pure PTFE increased elongation or resiliency, superior barrier properties, and better adhesion or compatibility with the rubber compound used for the closure. As used herein, the term "PTFE" is intended to encompass all such variants and modifications.

In any event, because of the relatively poor sealing properties of PTFE, partially PTFE laminated rubber closures have been developed. Typically, one of two methods are used for making such partially laminated closures. In the first method, PTFE is introduced into a mold half. The PTFE is cut such that it extends partially up the sides of the mold half. Rubber compound is then introduced into the mold and the closure is formed. Since the PTFE extended only partially up the sides of the mold, it only partially covers the formed part. One problem with this type of molding, is that due to the properties of the PTFE, it generally does not adhere well to the mold half and therefore can get dislodged prior to forming the part. Accordingly, a large number of unacceptable closures are developed.

A second method for molding partially PTFE laminated closures is shown in U.S. Pat. No. 4,915,243 to Tatsumi et al. Briefly, the lower portion of the stopper is formed by compression molding a rubber sheet laminated with a PTFE material. The PTFE/rubber laminate is preformed as a sheet to be used as a raw material for this process. The lower portion of the closure is then formed, generally including only the legs of the closure.

Once molded, the pieces are cut apart and loaded into a second compression mold. The second process molds pure rubber compounds to the top portion of the rubber/PTFE laminate to produce a partially laminated rubber closure. In order to produce such a closure, the sheet of rubber or rubber/PTFE laminate must be compressed from a flat sheet into a series of closures or partial closures. Accordingly, since some of the deformation is elastic and the stresses placed on the sheet are radial, the closure precursor or finished closure may deform significantly upon removal from the mold. Accordingly, precision parts can not be efficiently produced.

Further, closures with long leg portions protruding into a vial cannot be produced since the PTFE cannot be drawn into a mold under such compression molding conditions. One problem with the closures produced by this process, as well as other partially laminated PTFE closures is that once the vials are filled and the closures are secured to the vials, but before an aluminum cap is applied, the closure, with its smooth, low friction PTFE barrier coating, can back-out of the vial due to vibration of the vials on the production line.

SUMMARY OF THE INVENTION

Applicants have produced a partially PTFE laminated rubber closure for pharmaceutical vials which resists undesired removal prior to placement of an aluminium over-cap on the vial and closure. The present invention comprises a rubber closure for closing the mouth of a vial comprising a flat circular head which protrudes over the end of the pharmaceutical vial. Secured to the underside of the head is a cylindrical sealing portion which is partially laminated with PTFE at its lower end. The sealing portion is hollow in the center of the underside and is fully laminated throughout the hollow portion with PTFE. Above the end of the PTFE on the outside of the sealing portion is a protruding ring of rubber. This ring allows good high friction contact between the closure and the vial which aids sealing and prevents the closure from dislodging during transportation of the vial after application of the closure and prior to application of the aluminum overcap.

Due to the inadequacies of compression molding and the residual stresses and deformations formed thereby, the present invention is formed through injection molding which minimizes the residual stresses and deformation of the finished part, allowing the production of a precision molded part having a sealing ring between the end of the PTFE laminate and the underside of the head.

DETAILED DESCRIPTION OF THE DRAWINGS

Figure 1:
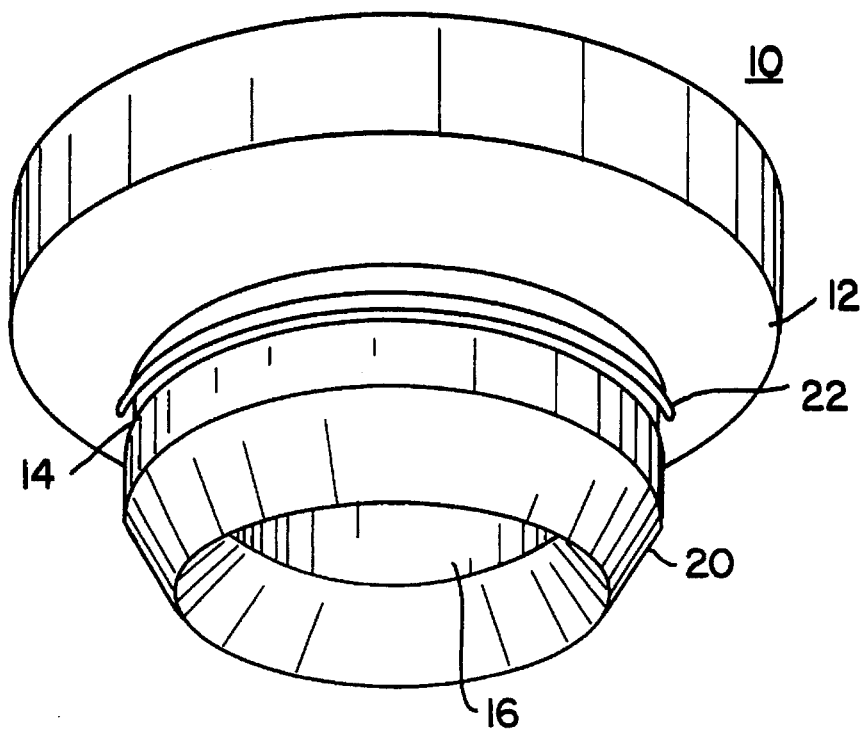
FIG. 1 is a perspective view of the partially laminated closure of the present invention.

Referring now to FIG. 1, the closure 10 of the present invention comprises a head 12 formed from a suitable rubber material. As previously stated, rubber closures for medical vials are well known, as is the material for making them. Thus any person skilled in the art would know of many different types of rubber compounds suitable for making closures for pharmaceutical vials including natural rubber, silicone rubber, butyl rubber, polyisoprene, neoprene, nitrile rubber, etc., any of which are useful in the present invention. The term "rubber" as used herein is intended to encompass all elastomeric materials suitable for the production of pharmaceutical vial closures. Most such rubber materials will be thermoset resins, and such thermoset resins are preferred to be used in the present invention.

Sealing portion 14 protrudes from the underside of head 12. Sealing portion 14 is generally cylindrical, but narrows near the lower end. This allows simple placement of the closure in a vial. Once placed in a pharmaceutical vial, it is not intended that the closure will be removed. The contents of the vial will normally be extracted using a needle and syringe. To facilitate easy access to the contents of the vial with a needle, it is desirable to reduce the thickness of the closure. Of course, the closure must have a suitable thickness to maintain rigidity, and to ensure an adequate sealing surface along sealing portion 14. Therefore, to reduce the thickness of closure 10 to allow a needle to penetrate easily, sealing portion 14 has an indentation 16 in the underside thereof, as can be easily seen from FIG. 2. Head 12 also has an indentation 18 therein. these two indentations together provide a thin portion in the center of closure 10 through which a needle may easily penetrate. The distance between the deepest points of indentation 16 and indentation 18 should generally be between 0.050 and 0.175 inches. Preferably, this distance is about 0.110 inches.

Figure 3:
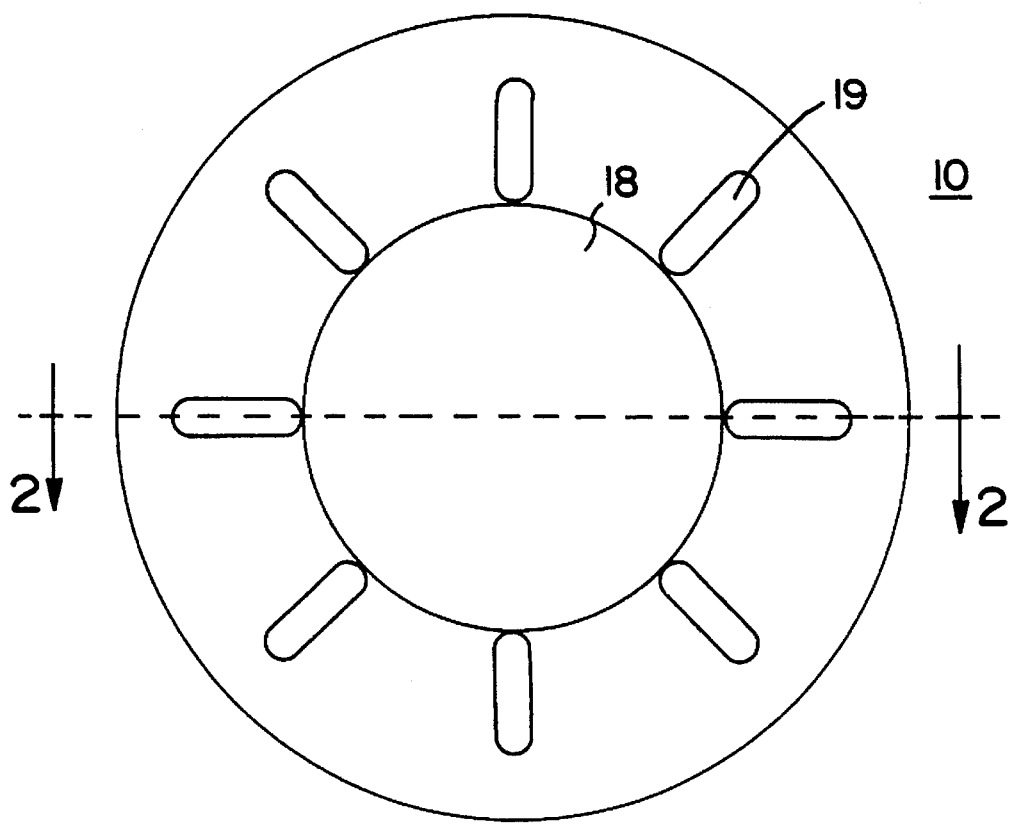
FIG. 3 is a top plan view of the partially laminated closure of the present invention.

Referring now to FIG. 3, closure 10 includes a plurality of ribs 19 arranged on the upper surface of head 12. These ribs are intended to increase the ease of handling of large numbers of closures. When many closures are placed in one container for shipment or in a hopper prior to application to vials, two closures oriented back-to-back, with indentations 18 on each of the two closures can form a suction seal between the closures making them difficult to separate. This can make the closures difficult for the feeder to handle. Ribs 19 prevent a vacuum from forming between two adjacent closures 10, and the closures will not stick together. Thus, although ribs 19 are shown arranged radially around head 12, any suitable arrangement may be used. Furthermore, to prevent the closures from sticking to one another, ribs 19 need only be about 0.010 inches in height.

Figure 2:
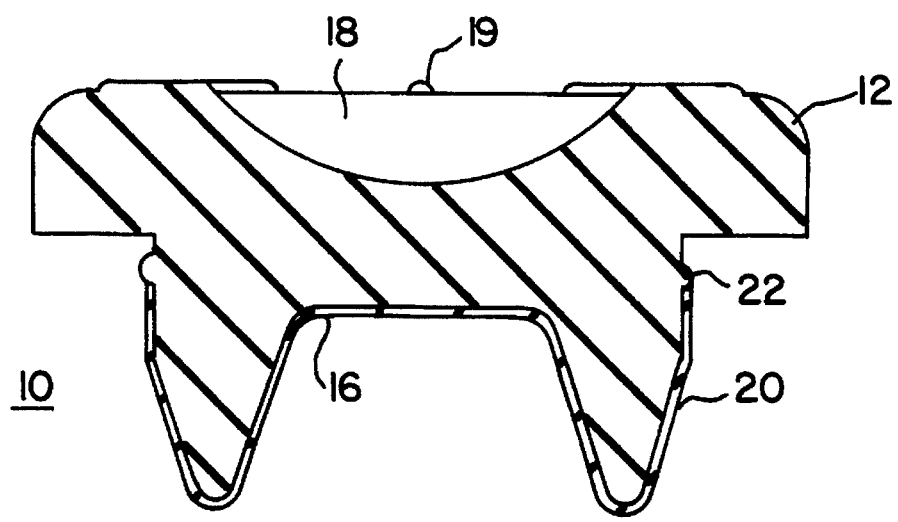
FIG. 2 is a cross-sectional view of the partially laminated closure of the present invention.

As may be seen from FIGS. 1 and 2, sealing portion 14 includes a PTFE laminate layer 20 over the lower portion thereof, including all of indentation 16. PTFE layer 20 extends partially up the sides of sealing portion 14. Located on sealing portion 14 above the end of PTFE layer 20 is sealing ring 22. Sealing ring 22 has a semicircular cross-section and should project radially outward from sealing portion 14 a distance of between 0.005 and 0.020 inches, preferably about 0.010 inches. It should be slightly larger than the thickness of PTFE laminate 20, which should be between 2 mils (0.002 inches) and 10 mils (0.010 inches), preferably about five mils (0.005 inches) thick. Sealing ring 22 is located above PTFE layer 20, such that it is not laminated, to ensure a good seal with the inside of the neck of a pharmaceutical vial. Sealing ring 22 can be spaced from PTFE laminate layer 20 as shown in FIG. 1, or it can abut PTFE layer 20 as shown in FIG. 2. Sealing ring 22 should be spaced slightly from the underside of head 12. To ensure a good seal, sealing ring 22 should be spaced at least about 0.030 inches from the underside of head 12. Sealing ring 22 may be spaced farther from head 12, but this will result in an elongation of sealing portion 14 and indentation 18 and or indentation 16 will have to be made larger. Generally, sealing ring 22 should be spaced no farther than 0.120 inches from head 12.

As may be seen from FIG. 2, indentation 16 extends into closure 10 no further than the end of PTFE laminate layer 20 on the outside of sealing portion 14. Therefore, that area of sealing portion 14 located within sealing ring 22 is solid. This provides a rigid structure to exert pressure on the pharmaceutical vial through sealing ring 22 with little or no deformation, which produces an excellent seal between closure 10 and the vial.

Figure 4:
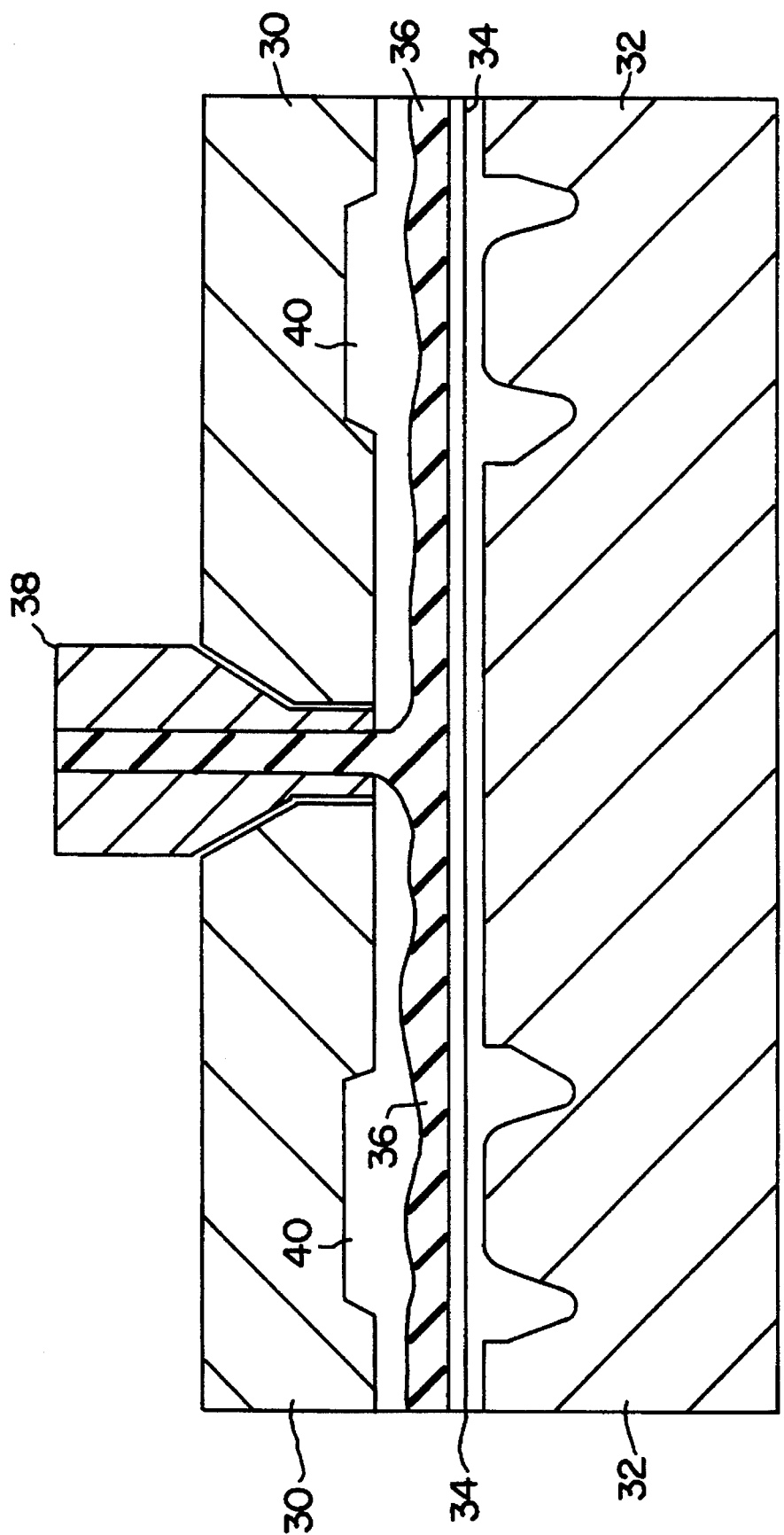
FIG. 4 is a cross-sectional view of a mold for making the leg portion of the partially laminated closure of the present invention, after injection of material.

Due to the inadequacies of compression molding, it is difficult or impossible to produce the closure of the present invention through compression molding in an efficient and economical manner. Due to shifting of the intermediate stage in the final mold, many unacceptable products are formed, decreasing efficiency and increasing cost of the closure. Therefore, the closure of the present invention has been produced by injection molding. Turning now to FIG. 4, a precursor for the closure of the present invention is produced using an upper mold half 30 and a lower mold half 32. A sheet of PTFE material 34 is introduced between the mold halves before the two halves are closed.

Although many forms of PTFE sheets are useable with the present invention, it is preferred to use DF1100 laminated PTFE available from Chemfab Corp. of Merrimack, N.H. Most PTFE sheets are produced by skiving sheets from a log or roll of PTFE. Upon heating, these PTFE sheets tend to curl back to their natural state. This is a problem in the present invention since the mold halves remain sufficiently hot to curl the PTFE sheets, and defective and unacceptable closures will be formed. The preferred PTFE sheets are made by sequential deposition of several thin layers of PTFE in sheet form (referred to herein as "sheet laminate"). This material is flat from the beginning and generally will not curl upon heating. Other PTFE sheet laminates should also perform adequately in the process of the present invention. However, the PTFE laminate 20 (whether or not if the "sheet laminate" type) used with the present invention should, in any event, have an elongation at failure of at least 600% and preferably at least 1200%.

Once PTFE sheet 34 is positioned between mold halves 30 and 32, the mold halves are moved close together, as is shown in FIG. 4, and molding compound 36 is introduced on top of PTFE sheet 34 through injector 38. Molding compound 36 is flowable and spreads out to cover the mold. Molding compound 36 is shown leveled in FIG. 4.

Figure 5:
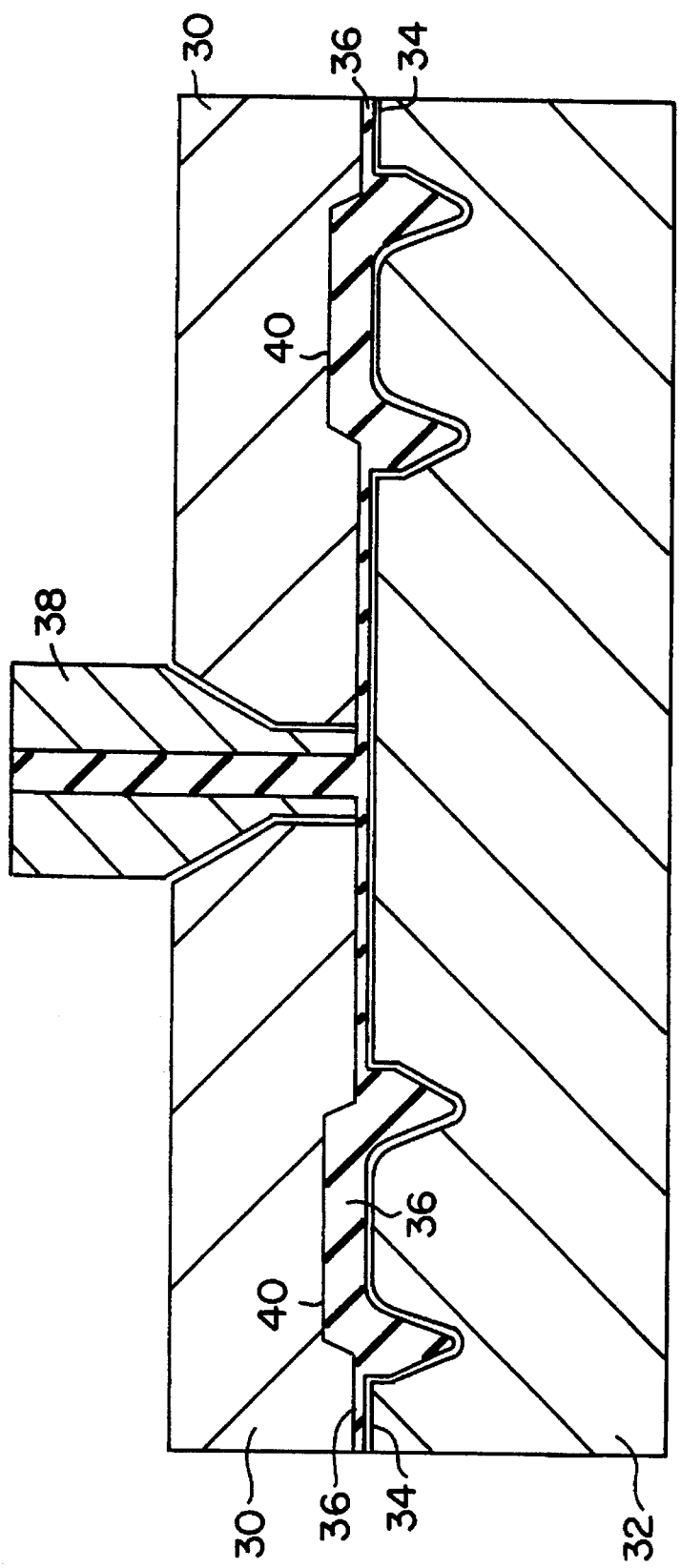
FIG. 5 is a cross-sectional view of a mold for making the leg portion of the partially laminated closure of the present invention, after compression.

Once an adequate amount of molding compound 36 is introduced into the mold, full molding pressure is applied to mold halves 32 and 34, and the mold halves move into the position shown in FIG. 5. As the mold halves move closer together, molding compound 36 is forced into the molds 40 for the closure precursor. The molds are then maintained under full pressure as heat is applied to cure molding compound 36. The time and temperature best suited to cure the molding compound will depend upon the particular compound selected. For instance, if natural rubber is used, a cure of between five to seven minutes at 325° F. is usually adequate to cure the rubber. If a butyl rubber is used, a cure of between twenty-five seconds and eight minutes at 370° F. is needed, depending upon the presence of, and selection of, a cure additive to the butyl rubber.

Figure 6:
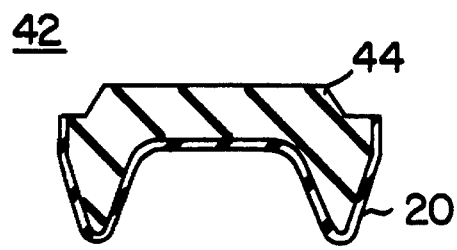
FIG. 6 is a cross-sectional view of a laminated leg portion of the partially laminated closure of the present invention.

Once the molding compound 36 has been cured, the mold is opened and the part-trimmed to produce the closure precursor 42 shown in FIG. 6. Closure precursor 42 includes PTFE laminate layer 20 and the lower part of sealing portion 14. Closure precursor 42 is normally made with a protrusion 44 in the top thereof to increase the surface area available for bonding, but can be made flat.

Figure 7:
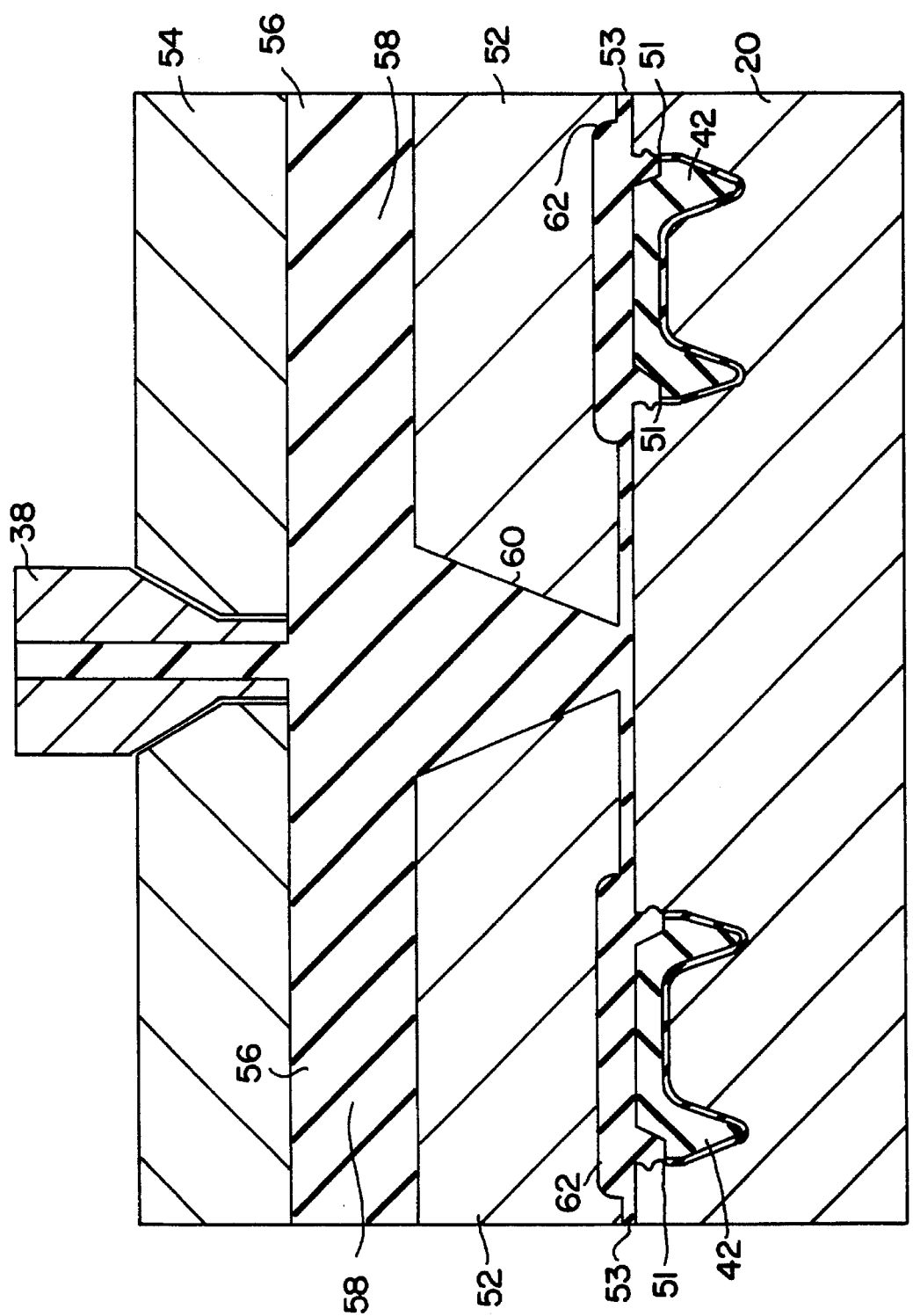
FIG. 7 is a cross-sectional view of a mold for making the partially laminated closure of the present invention after injection of material and compression.

Closure precursor 42 is then introduced into the lower half 50 of the final mold, as shown in FIG. 7. Closure precursor 42 is retained in lower half 50 by snap groove 51 (which is a slight undercut in lower mold half 50). Upper mold half 52 is placed over lower mold half 50, and the mold is closed. When the two mold halves 50 and 52 are closed, a gap 53 of about 0.030 inches remains between the faces of the mold halves, as shown in FIG. 7. Transfer pot 54 is placed over upper mold half 52, and molding compound 56 is introduced into area 58 between transfer pot 54 and upper mold half 52, through injector 38. Here, upper mold half 52 acts as a transfer compression tool, enabling transfer of material from area 58 and application of compression to molding compound 56 once it has been transferred into the mold. Molding compound 56 may be the same as molding compound 36, but it may also be different so long as they are compatible.

When an adequate amount of molding compound 56 has been introduced into area 58, transfer pot 54 (along with injector 38) is pressed down towards upper mold half 52. This forces molding compound 56 through transfer sprue 60 and into mold openings 62, which form closure 10. The molding compound is then cured as described earlier. Once cured, the closure is trimmed to produce a finished closure.

Figure 8:
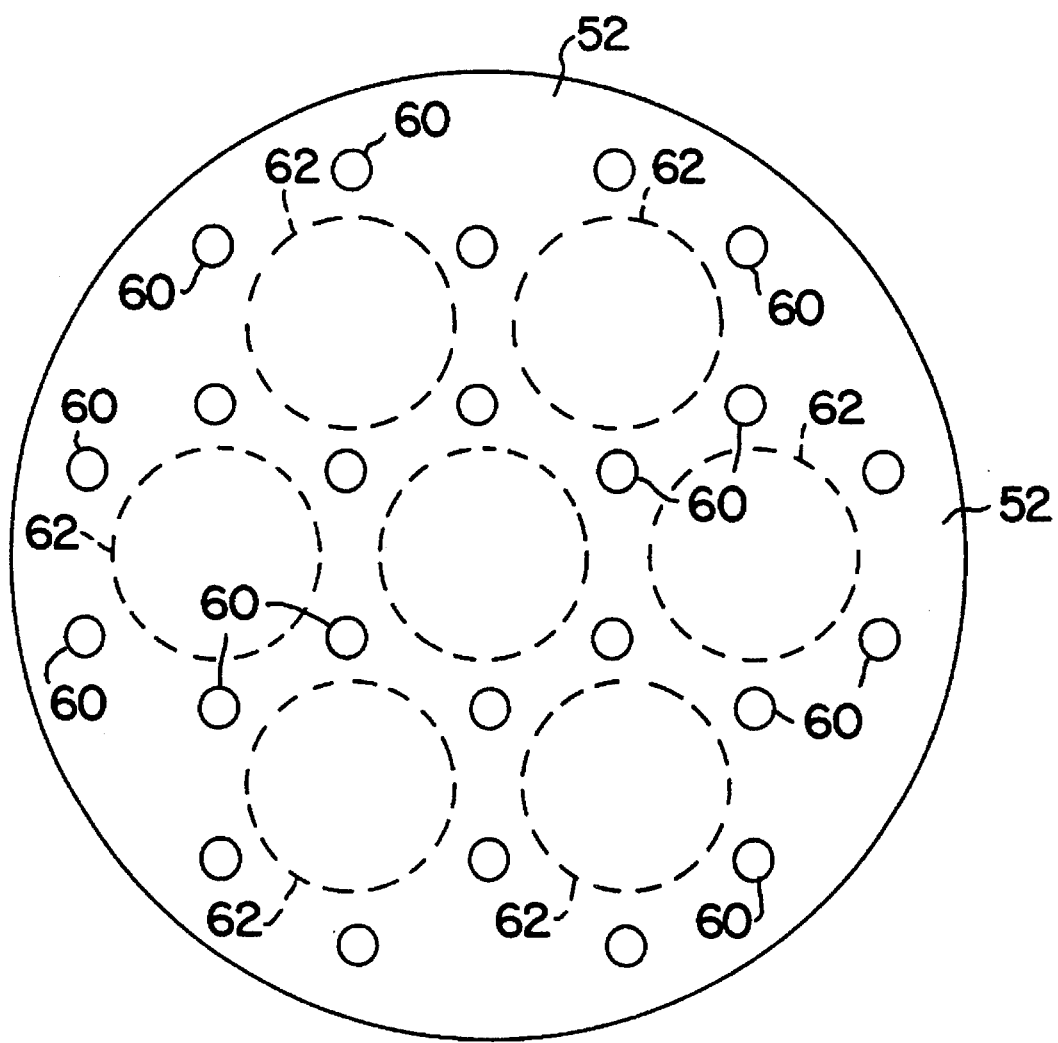
FIG. 8 is a plan view of the upper mold for making the partially laminated closure of the present invention.

As discussed earlier, movement of the closure precursor in the final mold upon introduction of material is a problem, although one which is most often encountered in compression molding. To help reduce the incidence of movement of the precursor, the method of the present invention involves introduction of material into the final mold at a number of sites (transfer sprues 60) distributed around the final mold. This can more easily be seen in FIG. 8. FIG. 8 shows upper mold half 52 as seen when viewed from the top (transfer pot side). Mold openings 62 are shown in phantom to indicate where they are placed on the underside of upper mold half 52. Transfer sprues are located at six points around each mold opening 62. As may be seen from FIG. 8, several transfer sprues serve multiple mold openings. Transfer sprues 60 introduce material into mold openings 62 only indirectly, by introducing compound into the overflow portion of the mold between top mold half 52 and lower mold half 50 (as seen in FIG. 7). Most importantly, molding compound 56 is introduced evenly into each mold opening 62 to minimize forces tending to dislodge closure precursors 42 from their seated positions in lower mold half 50.

While this invention has been described with respect to specific embodiments, it should be understood that various other modifications will be apparent to those skilled in the art without departing from the spirit and scope of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed:

1. A method of manufacture of a partially laminated rubber closure comprising:

placing a sheet of a barrier coating material in a closure precursor mold and partially closing said mold;

injecting rubber into said mold;

fully closing said mold under heat and pressure sufficient to mold and cure said rubber and form a closure precursor, said sheet forming a layer of barrier coating material on said closure precursor;

removing said closure precursor from said precursor mold;

positioning said closure precursor in a final mold;

introducing additional rubber, by injection molding, laterally into said final mold from a plurality of locations equally spaced around said closure precursor so as to fill said final mold and minimize forces tending to dislodge said closure precursor from said position in said final mold; and applying heat and pressure to said final mold to cure said additional rubber thereby forming said partially laminated rubber closure.

2. The method of claim 1 wherein said additional rubber is introduced into said final mold in an overflow area of said final mold.

3. The method of claim 1 wherein said additional rubber is introduced into said final mold by injection of said additional rubber on top of said final mold followed by compression of said additional rubber into said final mold.

4. The method of claim 1 wherein said closure precursor is positioned in said final mold by placing said closure precursor in an undercut area in said final mold.

5. The method of claim 1 wherein said barrier coating material is polytetrafluoroethylene.

6. The method of claim 5 wherein said barrier coating material has an elongation at failure of at least 600%.

7. The method of claim 5 wherein said barrier coating material has an elongation at failure of at least 1200%.

\* \* \* \* \*

UNITED STATES PATENT AND TRADE MARK OFFICE
CERTIFICATE OF CORRECTION

PATENT NO. : 5,484,566
DATED : January 16, 1996
INVENTOR(S) : Gabbard

It is certified that error appears in the above-identified patent and that said Letters Patent is hereby corrected as shown below:

On the cover page of the patent, item [56] References Cited, U.S. PATENT DOCUMENTS list the following:

| | | |
|---|---|---|
| 3,653,528 | 4/1972 | Wimmer |
| 4,316,941 | 2/1982 | Eguchi et al. |
| 4,366,912 | 1/1983 | Matukura et al. |
| 4,614,276 | 9/1986 | Ihara et al. |
| 4,915,243 | 4/1990 | Tatsumi et al. |

FOREIGN PATENT DOCUMENTS list:

524,169    4/1956    Canada

OTHER DOCUMENTS list:

Drawing of product believed publicly available prior to March 7, 1994.

Signed and Sealed this

Twenty-third Day of July, 1996

Attest:

BRUCE LEHMAN

Attesting Officer    Commissioner of Patents and Trademarks